United States Patent
Kypreos et al.

(10) Patent No.: US 7,269,218 B2
(45) Date of Patent: Sep. 11, 2007

(54) PROCESS AND DEVICE FOR DECODING VIDEO DATA CODED ACCORDING TO THE MPEG STANDARD

(75) Inventors: Jean Kypreos, Betton (FR); François Edouard, Bourg des Comptes (FR); Dominique Thoreau, Cesson Sévigné (FR)

(73) Assignee: Thomson Licensing, Boulogne-Billancourt (FR)

(*) Notice: Subject to any disclaimer, the term of this patent is extended or adjusted under 35 U.S.C. 154(b) by 496 days.

(21) Appl. No.: 10/267,623

(22) Filed: Oct. 9, 2002

(65) Prior Publication Data
US 2003/0072369 A1    Apr. 17, 2003

(30) Foreign Application Priority Data
Oct. 11, 2001  (FR)  ................... 01 13083

(51) Int. Cl.
*H04N 7/12*  (2006.01)
*G06K 9/46*  (2006.01)
(52) U.S. Cl. ................. 375/240.03; 382/251
(58) Field of Classification Search .......... 375/240.03, 375/240.01, 240.16, 240.18, 240.2, 240.27; 382/232, 251
See application file for complete search history.

(56) References Cited

U.S. PATENT DOCUMENTS

| 5,844,609 | A | * | 12/1998 | Filor et al. ............. 375/240.01 |
| 5,870,497 | A | * | 2/1999 | Galbi et al. ................. 382/232 |
| 5,959,872 | A | | 9/1999 | Son ............................ 365/725 |
| 5,966,470 | A | * | 10/1999 | Miyashita et al. .......... 382/248 |
| 6,862,320 | B1 | * | 3/2005 | Isu et al. ................ 375/240.27 |

FOREIGN PATENT DOCUMENTS

| EP | 786902 A1 | 7/1997 |
| EP | 948212 A2 | 10/1999 |
| JP | 2001125294 | 4/2000 |

OTHER PUBLICATIONS

EPO 609039 European Search Report, T. Gries, Mar. 8, 2002.

\* cited by examiner

*Primary Examiner*—Gims Philippe
(74) *Attorney, Agent, or Firm*—Joseph J. Laks; Robert B. Levy

(57) ABSTRACT

The process is characterized in that it performs the inverse operations (26, 27, 28) of the successive coding operations, in an inverse order, coefficient by coefficient rather than block by block.

Applications relate to the compression of video data.

6 Claims, 4 Drawing Sheets

|  |  |  |  |  |  |  |  |
|---|---|---|---|---|---|---|---|
| 0 | 1 | 8 | 16 | 9 | 2 | 3 | 10 |
| 17 | 24 | 32 | 25 | 18 | 11 | 4 | 5 |
| 12 | 19 | 26 | 33 | 40 | 48 | 41 | 34 |
| 27 | 20 | 13 | 6 | 7 | 14 | 21 | 28 |
| 35 | 42 | 49 | 56 | 57 | 50 | 43 | 36 |
| 29 | 22 | 15 | 23 | 30 | 37 | 44 | 51 |
| 58 | 59 | 52 | 45 | 38 | 31 | 39 | 46 |
| 53 | 60 | 61 | 54 | 47 | 55 | 62 | 63 |

FIG.5a

Zig-zag scan

|  |  |  |  |  |  |  |  |
|---|---|---|---|---|---|---|---|
| 0 | 1 | 2 | 3 | 8 | 9 | 16 | 17 |
| 10 | 11 | 4 | 5 | 6 | 7 | 15 | 14 |
| 13 | 12 | 19 | 18 | 24 | 25 | 32 | 33 |
| 26 | 27 | 20 | 21 | 22 | 23 | 28 | 29 |
| 30 | 31 | 34 | 35 | 40 | 41 | 48 | 49 |
| 42 | 43 | 36 | 37 | 38 | 39 | 44 | 45 |
| 46 | 47 | 50 | 51 | 56 | 57 | 58 | 59 |
| 52 | 53 | 54 | 55 | 60 | 61 | 62 | 63 |

FIG.5b

Alternating horizontal scan

|  |  |  |  |  |  |  |  |
|---|---|---|---|---|---|---|---|
| 0 | 8 | 16 | 24 | 1 | 9 | 2 | 10 |
| 17 | 25 | 32 | 40 | 48 | 56 | 57 | 49 |
| 41 | 33 | 26 | 18 | 3 | 11 | 4 | 12 |
| 19 | 27 | 34 | 42 | 50 | 58 | 35 | 43 |
| 51 | 59 | 20 | 28 | 5 | 13 | 6 | 14 |
| 21 | 29 | 36 | 44 | 52 | 60 | 37 | 45 |
| 53 | 61 | 22 | 30 | 7 | 15 | 23 | 31 |
| 38 | 46 | 54 | 62 | 39 | 47 | 55 | 63 |

FIG.5c

Alternating vertical scan

PROCESS AND DEVICE FOR DECODING VIDEO DATA CODED ACCORDING TO THE MPEG STANDARD

FIELD OF THE INVENTION

The invention relates to a decoding process and device utilizing the MPEG standard.

BACKGROUND OF THE INVENTION

The resources required for the processing of video, in particular within the context of a coding of MPEG 4 type generate a great deal of time-consuming processing and, if the decoding is not performed at a speed sufficient to allow correct overall processing, real-time problems may possibly arise.

The use of high-level object languages (for example C++) rather than assembler language, for the programming of the processing algorithms, does not go along with optimization of this processing time.

Moreover, the employing of ever more complex MPEG 4 decoding modes, the addition of new video tools which consume a great deal of computation time requires optimization of the processing times if one wishes to steer clear of powerful processors, so as to limit the size and the cost of the circuits for the MPEG 4 decoding, for example customized circuits of ASIC type.

SUMMARY OF THE INVENTION

The aim of the invention is to alleviate the aforesaid drawbacks.

Its subject is a process for decoding digital video data coded according to the MPEG standard on the basis of successive operations of coding blocks of coefficients, characterized in that it performs the inverse operations of the successive coding operations, in an inverse order, coefficient by coefficient rather than block by block.

According to a particular implementation, a coding operation consists in quantization of the coefficients, prediction of the DC/AC coefficients or zig-zag scanning.

According to a particular implementation, the inverse operations performed in the inverse order on a coefficient are successively scan inversion (26), construction, as appropriate, of the DC/AC coefficient (27) on the basis of the predicted DC/AC coefficient, inverse quantization (28) of the coefficient.

According to a particular implementation, the scan inversion (26) is calculated on the basis of an inverse zig-zag scan table, an inverse alternating horizontal scan table or an inverse alternating vertical scan table giving the actual position s of the coefficient in the block on the basis of the scanning rank n at the coder.

The invention also relates to a video decoding circuit for decoding video data coded according to the MPEG standard on the basis of successive operations of coding blocks of coefficients, characterized in that it comprises a processing circuit for implementing a decoding algorithm which performs the inverse operations (26, 27, 28) of the successive coding operations, in an inverse order, coefficient by coefficient rather than block by block.

The invention also relates to a digital apparatus comprising such a video decoding circuit.

By virtue of the invention, memory accesses are reduced, processing time is optimized, the cost and the size of the decoding circuits are reduced. The quality of the images is maintained, that is to say not degraded to compensate for excessively lengthy processing time.

BRIEF DESCRIPTION OF THE DRAWINGS

Other features and advantages of the invention will become clearly apparent in the following description given by way of nonlimiting example, and with regard to the appended figures which represent.

DETAILED DESCRIPTION OF PREFERRED EMBODIMENTS

Figure 1:
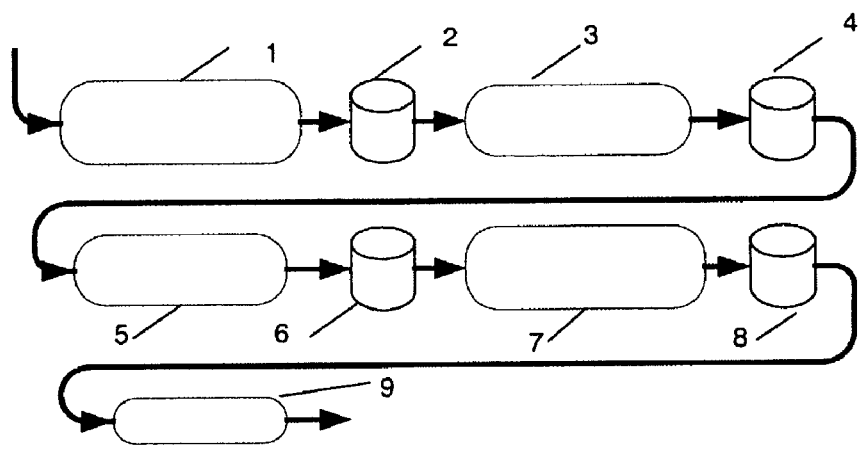
FIG. 1, a conventional diagram of a video decoding,
FIG. 2, a video decoding circuit,
FIG. 3, a decoding algorithm according to the invention,
FIG. 4, an example of the decoding of coefficients,
FIG. 5, inverse-scan arrays.

FIG. 1 diagrammatically shows a conventional video decoding.

The information relating to the video coding and stemming from the reading of the binary train of coded data undergoes a first processing 1 which is a variable-length decoding. The processed data are written to a memory 2. These data are stored in such a way as to represent an intermediate array of data. Next, the stored data are read by a second processing circuit 3 which performs a scan inversion. The data obtained are again stored in a memory 4, then are read by an inversion circuit 5, are stored by a memory 6, are processed by an inverse quantization circuit 7, are again stored by a memory 8 and are then read by an inverse transformation circuit 9.

These actions are carried out sequentially and per coding block of the image or of the video object plane vop described in the standard.

The invention makes it possible to avoid these numerous accesses to a memory and to these intermediate data arrays, these very time-consuming writes/reads. Moreover, a processing at the level of each coefficient rather than at image block level makes it possible to detect the zero coefficients, in general numerous in blocks corresponding to weakly textured or uniform zones. In a conventional scheme, all the coefficients are taken into account, the zeros are stored in an array. In the process according to the invention, the zero coefficients are not processed and are not stored during the intermediate calculations.

Figure 2:
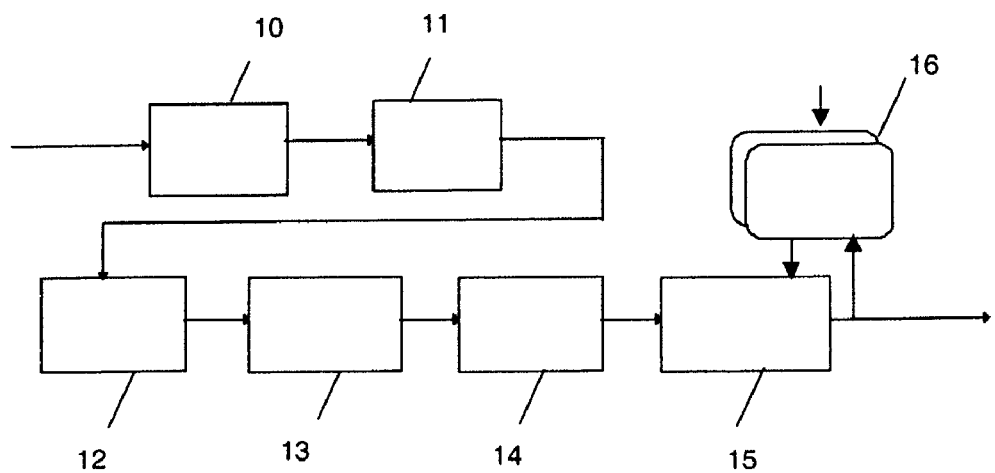

FIG. 2 represents, in a known manner, circuits of an MPEG type decoder.

The following notation is employed hereinafter to define the coefficients of the blocks at the various steps:

n is the rank of the coefficient corresponding to the scan chosen by the coder, (u, v) or s the actual spatial position of the coefficient in the block, u and v being the row and column number in the block, s being the spatial position defined conventionally on the basis of an ascending numbering going from 0 at the top left of the block to 63 at the bottom right, the incrementation being effected, for this block of 8×8 coefficients, from left to right and row by row.

QFS(n) corresponds to the quantized coefficient of rank n, after VLC decoding.

PQF(u,v) or PQF(s) corresponds to the quantized coefficient at the actual position (u,v) or s in the block, after inverse scanning.

QF(u,v) or QF(s) corresponds to the coefficient after inverse prediction as the case may be, that is to say the quantized reconstructed coefficient.

F(u,v) or F(s) corresponds to the dequantized QF coefficient.

The binary train resulting from the coding of the images according to the MPEG 4 standard is received at the input of a circuit 10. It involves the DCT coefficients coded according to a variable-length code or VLC. The circuit 10 is a variable-length decoding circuit which performs the operation inverse to the variable-length coding carried out by the coder.

The decoded data, which are the quantized coefficients, are transmitted to the input of an inverse scanning circuit 11 which carries out a scan inverse to the scan performed by the coder. On coding, a rank n was assigned to each coefficient of the block and the scan was performed sequentially in the order corresponding to the rank. The inverse operation therefore consists in repositioning the coefficients in the block on the basis of their number or rank n corresponding to the scan. Thus, the one-dimensional data representing the quantized coefficients of rank n, QFS(n), are transformed into two-dimensional data, PQF(u,v), which constitute an array of coefficients with column u and row v. For image blocks of 8×8 pixels, n corresponds to a value between 0 and 63, 0 being the rank of the DC coefficient, u and v lie between 0 and 7.

The circuit 12 performs an inverse prediction of the DC and AC coefficients for the intra-coded macroblocks, when such a prediction was utilized on coding. The DC coefficients of the current block then have to be calculated from predicted values which are the DC coefficients of the corresponding block of the macroblock above or preceding (that is to say to the left of) the macroblock to be decoded. One speaks respectively of vertical or horizontal DC prediction direction. This prediction direction is calculated, for each block of the current macroblock, as a function of the DC gradients of the corresponding block above (horizontal gradient with respect to the block to the left) and of the corresponding block to the left (vertical gradient with respect to the block above) of the current macroblock. The AC coefficients of the first row or first column also have to be calculated from predicted values which are respectively the AC coefficients of the first row of the corresponding block of the macroblock above or the AC coefficients of the first column of the corresponding block of the macroblock preceding the macroblock to be decoded. The direction of AC prediction of a block is that of DC prediction for this same block. Thus, for this mode of coding, only the first row or first column of the block is coded, the other coefficients are zero.

The circuit 13 receives the coefficients thus calculated QF(u,v) so as to perform an inverse quantization and provide dequantized coefficients F(u,v). The downstream circuit 14 then carries out an inverse discrete cosine transformation (DCT $^{-1}$) of the dequantized coefficients F(u,v), the coefficients obtained being f(y,x), x and y corresponding to spatial coefficients in the image rather than to frequency ranks as u and v. A vop memory 16 which stores the previous reconstructed image (or object) is utilized by the motion compensation circuit 15 which extracts the predicted macroblock designated by the motion vector associated with the current macroblock from this memory. In inter mode, this circuit 15 adds the decoded macroblock f(x,y) which it receives from the inverse transformation circuit to the predicted macroblock so as to provide the decoded macroblock.

The various processing described hereinabove is performed block by block, the data processed by the various circuits and transmitted from one circuit to another being blocks of coefficients or image blocks.

The various types of scanning, zig-zag scanning, horizontal alternating scanning and vertical alternating scanning are defined in the MPEG 4 standard, in ISO/IEC document 14496-2:1999(E) paragraph 7.4.2 (inverse scan). The decoding process according to the AC/DC predictive mode is defined in this same document paragraph 7.4.3 (intra dc and ac prediction for intra macroblocks).

Figure 3:
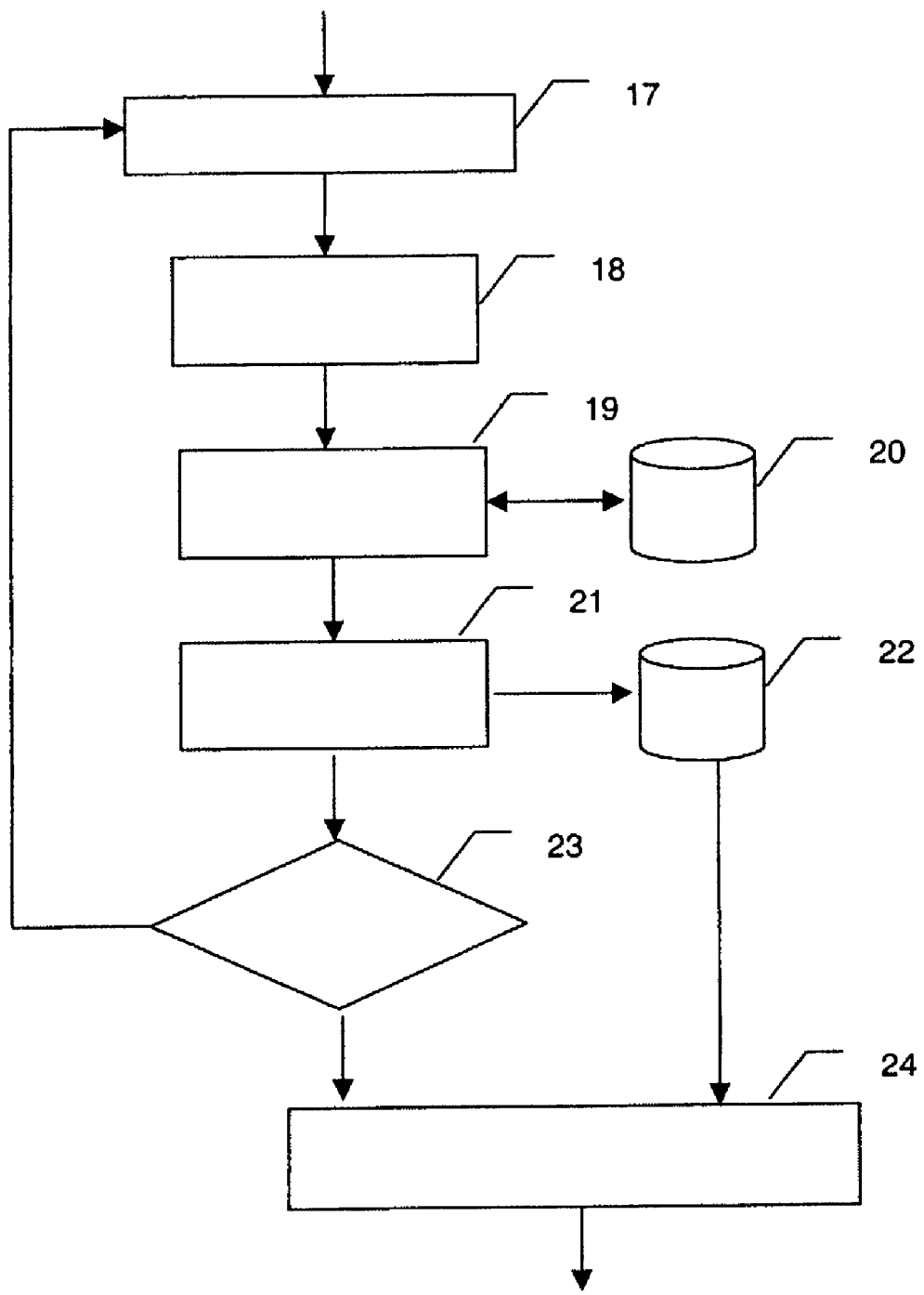

FIG. 3 represents an algorithm for processing the coefficient blocks according to the invention, where the processing is performed coefficient by coefficient rather than block by block.

The binary data stream comprising the DCT coefficients is processed during a first step 17. As indicated earlier, with each coefficient there corresponds a coefficient index number n which is the rank stemming from the scan at coder level. Step 17 extracts the coefficients of this binary stream, that is to say their value and their index number. A first coefficient is thus transmitted in step 18 which carries out an operation which is the inverse of the scan. The rank s calculated and the coefficient value are transmitted in the next step 19 which performs the processing corresponding to the DC/AC prediction. This step is in conjunction with the memory 20 which provides the DC/AC coefficients of the current image which are required for calculating the processed current coefficient, that is to say the coefficients on the basis of which the prediction was performed at coder level. The calculated value is stored in this memory 20 and is also transmitted to step 21 which performs an inverse quantization. The dequantized coefficient is stored in the memory 22. The next step 23 checks whether the processed coefficient is the last coefficient of the block of coefficients. If it is not, step 23 is looped back to step 17 which then provides the next coefficient in step 18. If it is, all the coefficients of the block having been processed, the next step is step 24 which retrieves these dequantized DCT coefficients from the memory 22 and performs an inverse DCT transformation on the complete block of DCT coefficients so as to provide the decoded image block.

Figure 4:
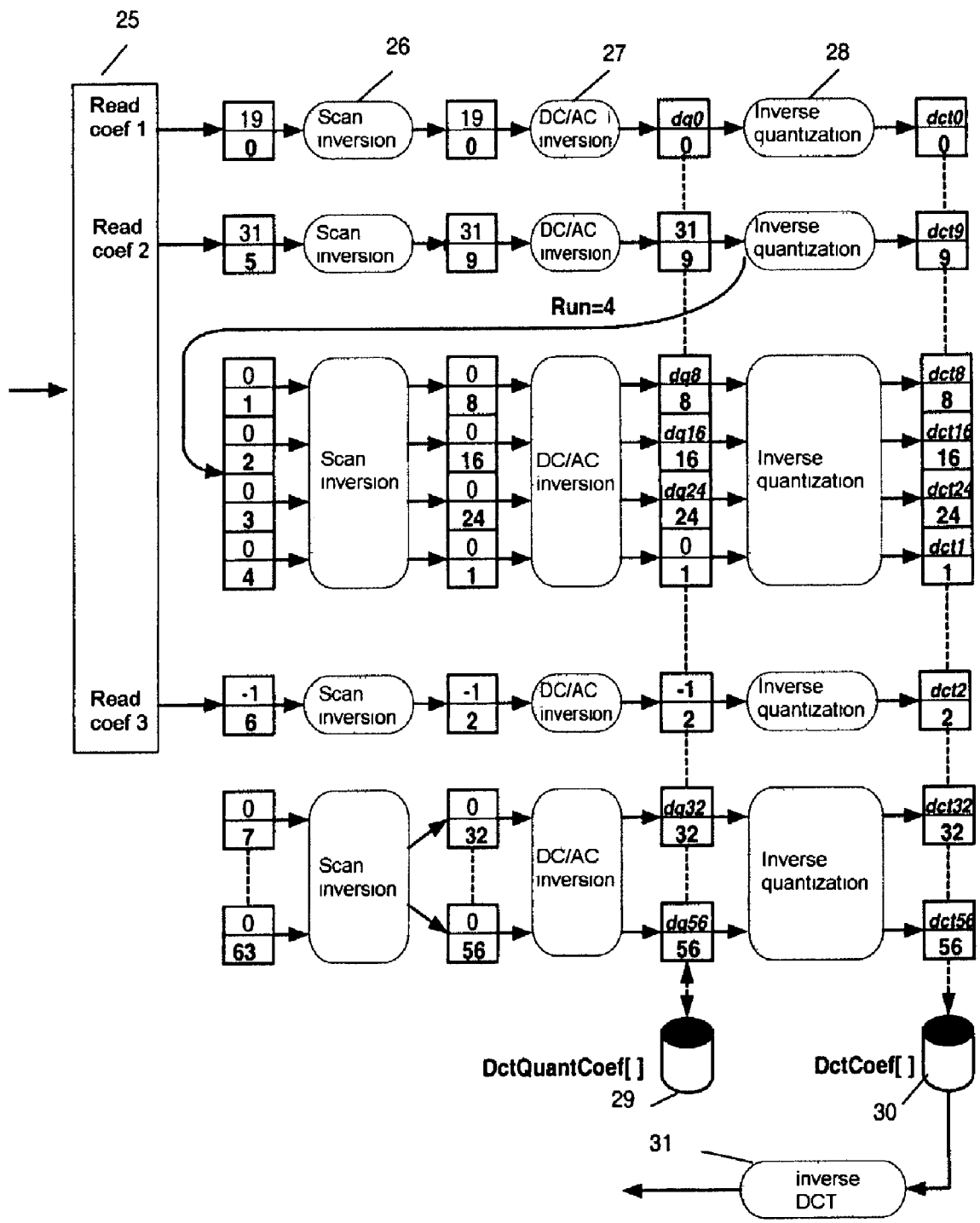

FIG. 4 gives an example of decoding the coefficients according to the invention.

The processed block is an 8×8 block consisting of three coefficients of value 19, 31 and −1 for a respective rank 0, 5 and 6, the other coefficients of the block having a zero value. The case processed is that where, on coding, the coefficients are calculated on the basis of a horizontal DC/AC prediction and the scan is performed in alternating vertical mode.

Represented in the figure is the entire set of operations performed on the coefficients of the block. These operations are carried out sequentially for each coefficient. The entire set of calculations or each calculation, scan inversion, DC/AC inversion, inverse quantization, is performed firstly on the first coefficient read then on the second coefficient, the third, etc.

Before processing the coefficients of a new block, the contents of the data arrays DctQuantCoeff[ ] referenced 29 and DctCoeff[ ] referenced 30 are set to zero.

The coded data arising from the data stream after VLC decoding are received by the circuit 25 which extracts the coded values of the coefficients of the block and transmits them successively at its output.

A first coefficient of value 19 and of rank 0 is thus read and transmitted to a scan inversion circuit 26.

$$PQF(u,v)=PQF(s)=QFS(n)$$

The aim of the scan inversion is to allocate the actual spatial position s to the coefficient of rank n processed, that is to say to calculate PQF(s) from QFS(n).

The scan array given in the standard for each type of scan indicates the value of the rank n in each location of the coefficient in the block corresponding to s. The inverse-scan arrays of FIG. 5, deduced from the scan arrays defined in the standard, make it possible to obtain the value of s directly for each location of the coefficient in the block corresponding to n. For example, for the alternating vertical scan, FIG. 5c, the location corresponding to n=5, that is to say the $6^{th}$ column, $1^{st}$ row, has the value s=9, the location corresponding to n=6 has the value 2.

QFS(0)=19=PQF(0)

QFS(5)=31=PQF(9)

The actual spatial position of the coefficient in the block is therefore obtained directly from these inverse-scan arrays of FIG. 5.

After this scan inversion, the coefficient is transmitted to an AC/DC inversion circuit referenced 27. The value of the coefficient is calculated as a function of the type of prediction, horizontal or vertical. Only the coefficients of the first row or first column are relevant, that is to say the coefficients of rank s lying between 0 and 7 and the coefficients 8, 16, 24, 32, 40, 48 and 56.

The AC/DC inversion circuit is linked to a memory DctQuantCoeff[ ] referenced 29 which stores the coefficients of the first row and first column of the previous blocks of the image. Here, the coefficient of rank 0 is involved and the inversion circuit searches through this memory for the coefficient dq0 which is the coefficient of rank zero of the block immediately to the left of the current block processed and which is the value on the basis of which the prediction at the coder was performed.

An inverse quantization circuit 28 then carries out the inverse quantization of the coefficient dq0 so as to provide the dequantized coefficient dct0. This circuit is linked to a memory DctCoeff[] referenced 30 which stores this coefficient.

After processing and storage of this first coefficient of rank zero, the next coefficient is utilized. The signal for transmission of this new coefficient by the circuit 25 to the circuit 26 is for example synchronized with the signal for writing this first coefficient to the memory 30. It may equally well originate from the scan inversion circuit 26. Specifically, the processing of the coefficients by the various circuits may be carried out quasi-simultaneously, that is to say without waiting for the storage of the current coefficient in the memory 30 for the processing of the next coefficient. Immediately after the freeing of a circuit by the current coefficient, the next coefficient can be processed by this circuit. Thus, the signal for transmitting the coefficient from one circuit to another is provided by the downstream circuit processing the previous coefficient.

The second nonzero coefficient of the current block is the coefficient of rank 5, of value 31. It is transmitted to the scan inversion circuit 26. In the figure, the circuits 26 to 28 are represented at least as many times as there are coefficients to be processed so that the coefficient values obtained during the intermediate steps are made explicit, for each of the coefficients processed. They may of course be the same processing circuits.

The inverse scan circuit 26 calculates the actual rank of the coefficient, which is now s=9.

QFS(5)=PQF(9)

The DC/AC inversion circuit 27 has no influence on the value 31 of this coefficient which is not situated in the first row or first column of the block. The value 31 is stored in the memory 29. Next, an inverse quantization is performed so as to provide a value dct9 for this coefficient of rank 9, which value is stored in the memory 30.

Next, the scan inversion circuit 26 takes into account the rank of the last coefficient processed and calculates the "run", that is to say the length of the suite of zeros. For a current coefficient, the "run" is equal to the number of coefficients with the value zero which are situated between the current coefficient and the previous nonzero coefficient.

The second nonzero coefficient having rank n=5, the suite of zeros preceding this second nonzero coefficient has a length of 4 (run=4). The values of the coefficients of rank 1 to 4 are zero. These four zero coefficients are processed by the scan inversion circuit 26. After the scan inversion, the ranks s of the coefficients corresponding to the ranks n=1 to 4, according to the array 5c, are respectively 8, 16, 24 and 1. The DC/AC inversion operation carried out by the circuit 27, allocates the values dq8, dq16 and dq24 to the coefficients with index number 8, 16, 24, the coefficients corresponding to the first column of the block, since a horizontal prediction is involved. These are the values of the coefficients corresponding to the block to the left of the current block, these values being stored in the memory 29. The value of the coefficient of rank 1 remains zero since this coefficient from the second column is not involved in the prediction operations. Finally, the inverse quantization circuit 28 calculates the dequantized values of the values dq8, dq16, dq24 and 0, namely dct8, dct16, dct24, dct1 respectively which are the values of the coefficients of rank s=8, 16, 24 and 1. The value dct1 is zero. These values are stored in the memory 30.

The circuit 25 now transmits the last nonzero coefficient to the circuit 26, namely the coefficient of rank n=6 which has the value −1. The scan inversion circuit 26 provides the corresponding rank s=2. This rank is not involved in the prediction operations and it is this same value −1, for a rank s=2, which is stored in the memory 29, at the output of the DC/AC inversion circuit 27. The inverse quantization circuit 28 provides a new dequantized value dct2 which is stored in the memory 30.

It is possible that coefficients from the first column, for the type of prediction relevant to us, although transmitted by the coder with the value zero, may have an actual value, that is to say after adding the predicted value, different from zero. If the value of the "run" is nonzero, it is therefore necessary to process in addition the coefficients skipped in the same manner as an extracted coefficient of nonzero value. It is necessary to check whether their actual spatial position (value s) corresponds to the first row or first column of the 8×8 block, depending on whether the prediction is a vertical or horizontal prediction. If it does, the coefficient is calculated as a function of the predicted values and is stored in the memory 29 since the DC/AC inversion calculation uses the values of the first rows and first columns of the previous blocks of the image. A counter cptNbDcAc is used to count the number of processed coefficients of the first column or first row depending on whether the prediction is a horizontal or vertical prediction. Once the processing of the last coefficient which is different from zero has been performed, the value of the counter is utilized and the processing of the zero coefficients continues until the counter reaches the value 8. A value of the counter less than 8 signifies in fact that between the last coefficient transmitted and the maximum number of coefficients to be extracted, there are still coefficients of zero value which have not been processed by the DC/AC inversion. It is therefore necessary to redo the DC/AC inversion operation followed by the inverse quantization operation for these missing coefficients.

In our example, the counter cptNbDcAc counts the number of processed coefficients of the first row. It is for example triggered by the scan inversion circuit as a function of the ranks s of the coefficients. For the first coefficient of rank n=s=0, the counter is incremented. The second coefficient is of rank s=9. The coefficients corresponding to the suite of zeros (run =4) are of rank s=8, s=16, s=24, s=1 and the counter is therefore incremented by 3 and has the value 4. The next coefficient is of rank s=2 and the subsequent zero coefficients will be processed until a counter value equal to 8 is obtained.

The coefficients of rank n=7 and the following ones, of zero value, are transmitted to the scan inversion circuit 26. This circuit provides the ranks s of these coefficients and the counter is incremented for the values of s corresponding to the first column, namely the values s=32, 40, 48, 56. Next, these coefficients are transmitted to the DC/AC inversion circuit 27 which calculates the actual value of each of them, as a function of the first column of the previous image block. The values found, dq32, dq40, dq48, dq56 are stored in the memory 29. They are also transmitted to the circuit 28 which performs a dequantization to obtain respectively the dequantized values dct32, dct40, dct48, dct56 stored in the memory 30.

The data array dctCoeff[ ] corresponding to the block of coefficients thus stored is read and transmitted to the inverse DCT circuit 31. The block transmitted undergoes inverse discrete cosine transformation to provide an image block.

A variant of the invention consists in eliminating the scan inversion at the input of the decoding loop, thus working directly on the spatially disordered dct coefficients.

The DC/AC inversion then calls upon a data array which indicates whether the coefficient does or does not need to be taken into account. For example on the basis of the alternating vertical scan array, by considering the coefficients of the first column which have rank n=0, 1, 2, 3, 10, 11, 12, 13, the data array assigns the value 1 for these values of n, the value 0 for the other values of n.

The inverse quantization is effected in the same manner as that described previously. On completion of the calculation, the results are spatially repositioned in the memory 30 so as to perform the inverse dct calculation requiring the results to be taken in order. The memory accesses are optimized during on-line accesses, this being tailored to the algorithm for calculating the inverse dct, which performs a row-wise followed by a column-wise calculation.

The description has been given for a coding utilizing DC/AC prediction. It would also be conceivable to utilize the invention without these prediction operations, for example for processing in accordance with the MPEG2 standard.

The invention relates to any type of decoder comprising software implementing the algorithm described earlier or any type of hardware such as television, DVD reader, satellite receiver comprising decoding circuits implementing this algorithm.

What is claimed is:

1. Process for decoding digital video data coded on the basis of successive coding operations, which are compatible with the MPEG standard, of blocks of coefficients, characterized in that it performs the inverse operations (26, 27, 28) of the successive coding operations, in an inverse order, so that only the coefficients of a block with a nonzero value and those based on a predicted value are processed sequentially, one by one, a processing corresponding at least to two successive inverse operations (26, 27, 28) among the following, scan inversion (26), construction, as appropriate, of the coefficient (27) on the basis of a predicted value, inverse quantization (28).

2. Process according to claim 1, characterized in that the scan inversion (26) is calculated on the basis of an inverse zig-zag scan table, an inverse alternating horizontal scan table or an inverse alternating vertical scan table giving the actual positions of the coefficient in the block on the basis of the scanning rank n at the coder.

3. Process according to claim 1, characterized in that, for a given image, the coefficients of the first row and column of a block, after construction, are stored in a memory (29) so as to be utilized during the construction of the coefficients of succeeding blocks of the image.

4. Process according to claim 1, characterized in that the coefficients are stored (30) after the inverse quantization operations so as to provide a stored block of coefficients and in that an inverse Fourier transformation (31) is performed on the stored block.

5. A Video decoding circuit for decoding video data coded on the basis of successive coding operations, which are compatible with the MPEG standard, of blocks of coefficients, characterized in that it comprises a processing circuit for implementing a decoding algorithm which performs the inverse operations (26, 27, 28) of the successive coding operations, in an inverse order, so that only the coefficients of a block with a nonzero value and those based on a predicted value are processed sequentially, one by one, a processing corresponding at least to two successive inverse operations (26, 27, 28) among the following, scan inversion (26), construction, as appropriate, of the coefficient (27) on the basis of a predicted value, inverse quantization (28).

6. Digital apparatus comprising a video decoding circuit according to claim 5.

* * * * *